United States Patent [19]
Giese

[11] Patent Number: 5,458,421
[45] Date of Patent: Oct. 17, 1995

[54] NEEDLE ROLLER BEARING

[75] Inventor: Peter Giese, Herzogenaurach, Germany

[73] Assignee: Ina Walzlager Schaeffler KG, Germany

[21] Appl. No.: 299,920

[22] Filed: Sep. 1, 1994

[30] Foreign Application Priority Data

Sep. 22, 1993 [DE] Germany .......................... 43 32 038.4

[51] Int. Cl.[6] .................................................... F16C 33/66
[52] U.S. Cl. ............................ 384/467; 384/481; 384/564
[58] Field of Search .................................... 384/467, 564, 384/481, 569, 551, 476

[56] References Cited

U.S. PATENT DOCUMENTS

| | | |
|---|---|---|
| 3,924,912 | 12/1975 | Pitner ........................ 384/564 |
| 4,869,604 | 9/1989 | Hill et al. .................... 384/564 |
| 4,907,898 | 3/1990 | Dickinson ................... 384/564 |
| 5,261,751 | 11/1993 | Heinz ........................ 384/467 |

Primary Examiner—Lenard A. Footland
Attorney, Agent, or Firm—Bierman and Muserlian

[57] ABSTRACT

A needle roller bearing (1) comprising an outer bearing ring (6), an inner bearing ring (8) arranged on a shaft (3) and needle rollers (9) which roll on mutually facing peripheral surfaces of said outer and inner bearing rings (6,8), characterized in that at one axial end, the outer bearing ring (6) and the inner bearing ring (8) comprise radially overlapping flanges (11,12) located axially next to each other with an axial sliding ring (13) arranged therebetween which bears against mutually facing end faces of said flanges (11,12) and, together with these flanges (11,12) and a peripheral surface of one of the bearing rings (6), defines a pressure chamber (15), pressure oil from the interior of the bearing penetrating into this pressure chamber (15) and flowing from there with a clear loss of pressure out of the needle roller bearing (1) by passing between at least one of said end faces of the flanges (11,12) and the axial sliding ring (13).

5 Claims, 2 Drawing Sheets

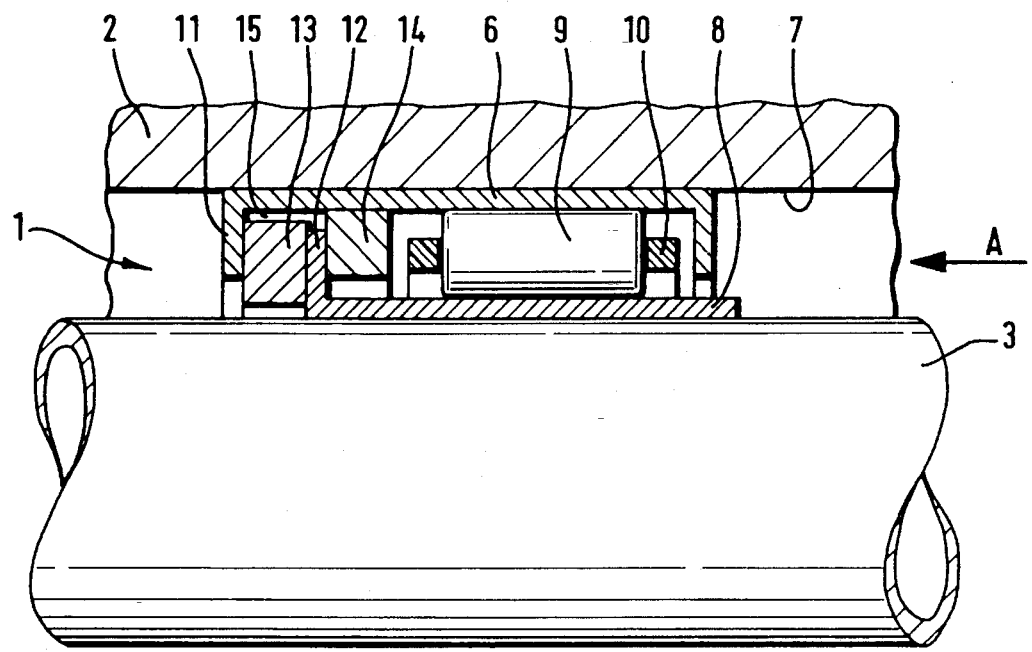
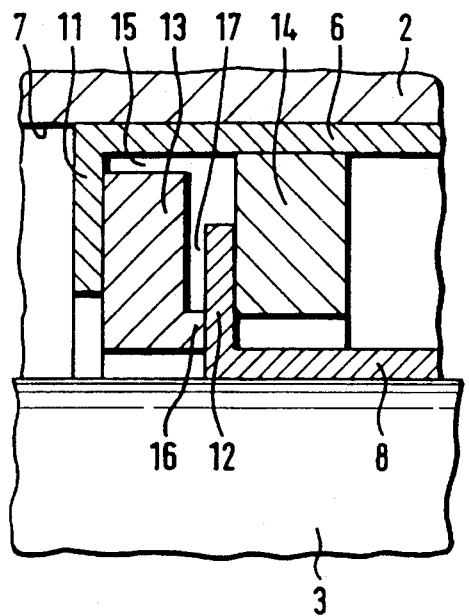
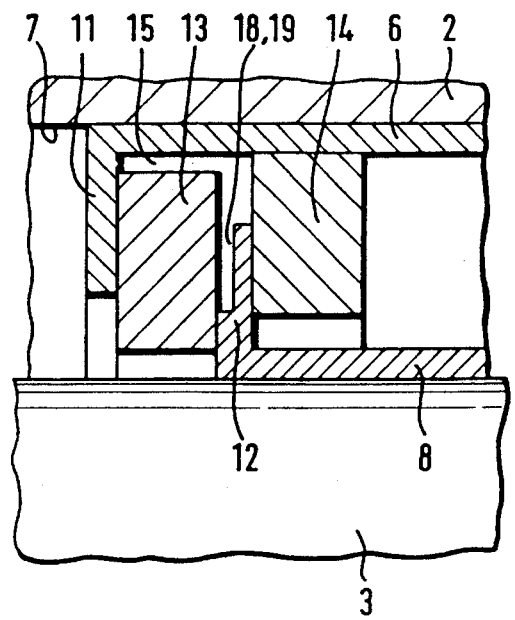

NEEDLE ROLLER BEARING

STATE OF THE ART

Needle roller bearings comprising an outer bearing ring, an inner bearing ring arranged on a shaft and needle rollers which roll on mutually facing peripheral surfaces of said outer and inner bearing rings are used for example in automatic transmissions of automotive vehicles and are subject to strong heating caused by loading.

OBJECTS OF THE INVENTION

It is an object of the invention to assure that the temperature of the bearing remains at an adequately low level by renewal of the oil to dissipate heat.

This and other objects and advantages of the invention will become obvious from the following detailed description.

THE INVENTION

The novel needle roller bearing of the invention comprising an outer bearing ring (6), an inner bearing ring (8) arranged on a shaft (3) and needle rollers (9) which roll on mutually facing peripheral surfaces of said outer and inner bearing rings (6,8), is characterized in that at one axial end, the outer bearing ring (6) and the inner bearing ring (8) comprise radially overlapping flanges (11,12) located axially next to each other with an axial sliding ring (13) arranged therebetween which bears against mutually facing end faces of said flanges (11,12) and, together with these flanges (11,12) and a peripheral surface of one of the bearing rings (6), defines a pressure chamber (15), pressure oil from the interior of the bearing penetrating into this pressure chamber (15) and flowing from there with a clear loss of pressure out of the needle roller bearing (1) by passing between at least one of said end faces of the flanges (11,12) and the axial sliding ring (13).

In the needle roller bearing of the invention, a flow of lubricating oil through the entire bearing is guaranteed whereby the oil in the region of the bearing is renewed and heat is dissipated together with the oil. A further advantage of the invention is that friction between the axial sliding ring and the end faces of the flanges is reduced by two effects: first, the oil stream between the end faces and the axial sliding ring reduces direct material contact and second, the axial force component acting in the pressure chamber due to the pressure prevailing therein reduces the resulting axial frictional force between the axial sliding ring and the end faces.

A piston ring interrupted by a slit can bear against the peripheral surface of one of the bearing rings and against the inner end face of the axially inner flange of the other bearing ring facing the needle rollers.

Advantageously, the axial sliding ring arranged between the parallel-faced flanges can have a substantially L-shaped longitudinal cross-section and an axially oriented arm of the axial sliding ring can bear against the end face of one of the flanges so that a recess opening towards the pressure chamber is formed between this end face and the axial sliding ring. Due to this enlargement of the pressure chamber in the radial direction, the effective force component of the pressure oil is increased in the axial direction so that a further reduction of friction between the axial sliding ring and at least one of the flanges is obtained.

Another embodiment of the invention possesses these advantages as well. In this variant of the needle roller bearing, an end face of one of the flanges facing the axial sliding ring comprises a step so that a recess opening towards the pressure chamber is formed.

According to a further development, the shaft on which the needle roller bearing is arranged serves as a pump shaft of an automatic transmission and is connected at one end to a primary part of a hydrodynamic torque converter and at the other end to an impeller of a primary pump, a radial sealing ring being arranged downstream of the axially outer flange. This radial sealing ring is therefore not exposed to the full pressure of the primary pump.

REFERRING TO THE DRAWINGS

FIG. 2 is a longitudinal cross-section of a needle roller bearing of the invention;

FIG. 3 is a partial longitudinal cross-section of another embodiment of the needle roller bearing of the invention;

FIG. 4 is a partial longitudinal cross-section of still another embodiment of the needle roller bearing of the invention.

Figure 1:
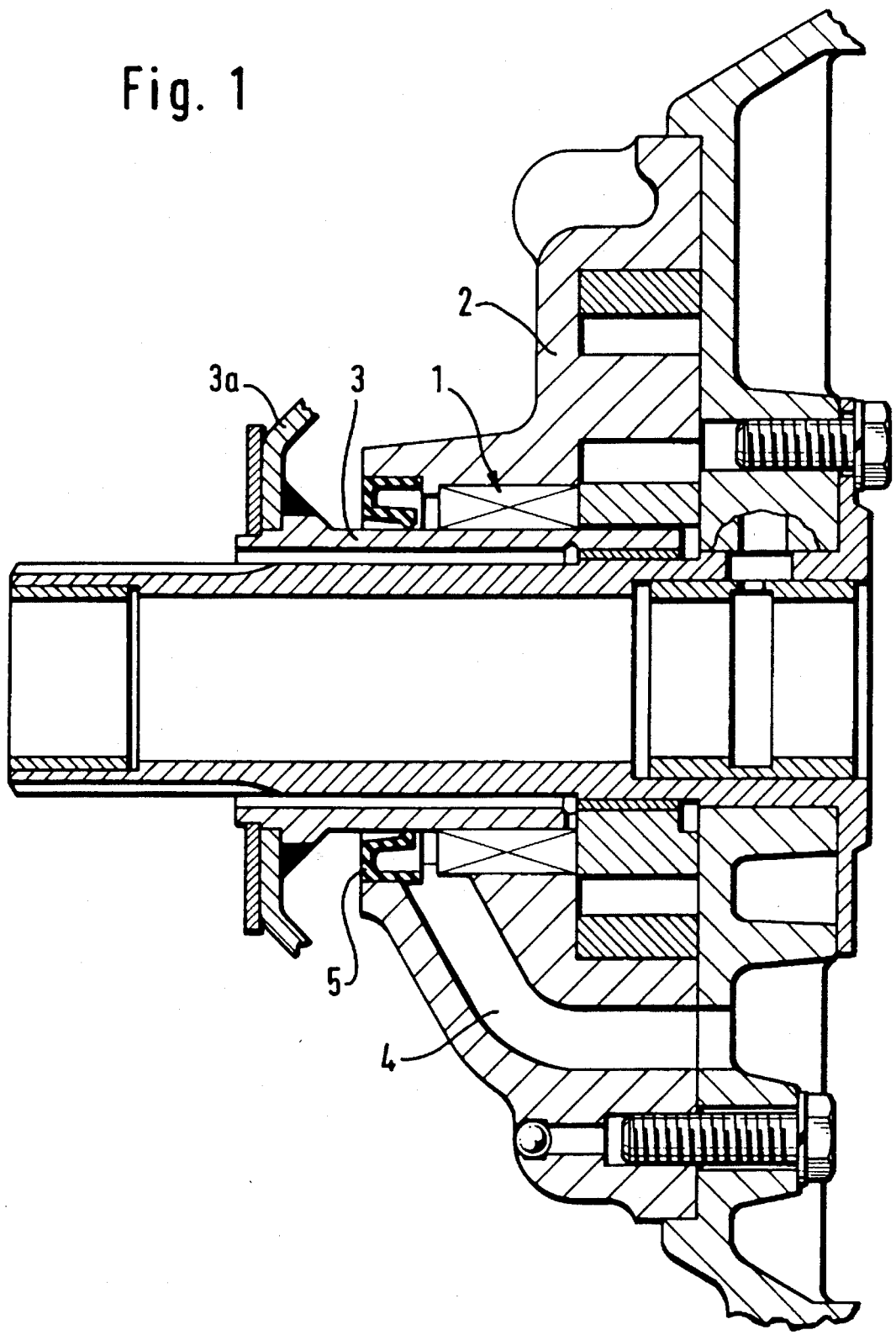
FIG. 1 is a cross sectional of view of a primary pump of a hydrodynamic torque converter of an automatic transmission comprising a needle roller bearing of the invention.

FIG. 1 shows a primary pump of a hydrodynamic torque converter of an automatic transmission. An only schematically represented needle roller bearing 1 of the invention is arranged around a hollow pump shaft 3 in a pump casing 2 of the primary pump. Oil flowing out of the needle roller bearing 1 is led off through a return bore 4 while a radial sealing ring 5 arranged downstream of the needle roller bearing 1 prevents the oil from flowing out of the pump casing 2 into a converter housing. At its end facing away from the primary pump, the hollow pump shaft 3 is connected to a primary part 3a (only partly represented) of the torque converter. Such primary pumps are generally well known. The needle roller bearing 1 of the invention is shown more clearly in FIGS. 2 to 4.

FIG. 2 shows a needle roller bearing 1 of the invention with its outer ring 6 inserted into a bore 7 of the pump casing 2. Needle rollers 9 retained in a cage 10 are arranged on the pump shaft 3. At one end, on the left-hand side of the figure, the outer ring 6 and the inner ring 8 comprise radial flanges 11 and 12 arranged axially spaced from one another with partial overlap. Between these radial flanges 11 and 12, there is arranged an axial sliding ring 13 which bears against the mutually facing end faces of the radial flanges 11, 12. A piston ring 14 interrupted in the peripheral direction by a slit, not represented, is arranged between the needle rollers 9 and the axially inner radial flange 12 to bear against the inner peripheral surface of the outer ring 6 and the inner end face of the radial flange 12. Pressure oil flows in the direction of the arrow A into the space between the outer ring 6 and the inner ring 8 and from there via the slit of the piston ring 14 into a pressure chamber 15 defined by outer ring 6, the radial flange 11, the axial sliding ring 13, the radial flange 12 and the piston ring 14.

On the left-hand side outside the bearing, there prevails approximately ambient pressure which means that an axial force component originating in the oil pressure exerts an axial load on the axial sliding ring 13 between the radial flanges 11 and 12. Upon flow of pressure oil into the pressure chamber 15, the pressure therein settles to a level approximately equal to the pressure in the interior of the bearing between the piston ring 14 and the needle rollers 9. This pressure equalization process in the pressure chamber 15 causes an axial force component which acts in opposition to the aforesaid axial force component whereby a reduction of the axial loading of the axial sliding ring is obtained. Due to the fact that the exit of the oil between the radial flange 12 and the axial sliding ring 13 is accompanied by a strong drop in pressure, a further reduction of direct frictional contact between the axial sliding ring 13 and the radial flange 12 is likewise obtained.

FIG. 3 shows a partial longitudinal cross-section of another embodiment of the needle roller bearing of the invention which differs from the aforesaid needle roller bearing of the invention of FIG. 2 only by the fact that the axial sliding ring 13 has an L-shaped configuration. An axially oriented arm 16 of the axial sliding ring 13 bears against the radial flange 12 so that a recess 17 opening towards the pressure chamber 15 is formed between the radial flange 12 and the axial sliding ring 13. This recess 17 enlarges the pressure chamber 15 in the radial direction so that the axial force component resulting from the oil pressure prevailing in the pressure chamber 15 is augmented leading to a reduction of the frictional contact between the axial sliding ring 13 and the radial flange 12.

The embodiment of the needle roller bearing of the invention in FIG. 4 differs from the initially described embodiment of FIG. 2 only by the fact that the end face of the radial flange 12 facing the axial sliding ring 13 comprises a step 18 so that a recess 19 opening towards the pressure chamber 15 is formed. In this embodiment, the pressure chamber 15 is enlarged by the recess 19 in the same manner as in the embodiment of FIG. 3 so that the same effects are obtained here as well.

Various modifications of the bearing of the invention may be made without departing from the spirit or scope thereof and it is to be understood that the invention is intended to be limited only as defined in the appended claims.

What is claimed is:

1. A needle roller bearing (1) comprising an outer bearing ring (6), an inner bearing ring (8) arranged on a shaft (3) and needle rollers (9) which roll on mutually facing peripheral surfaces of said outer and inner bearing rings (6,8), characterized in that at one axial end, the outer bearing ring (6) and the inner bearing ring (8) comprise radially overlapping flanges (11,12) located axially next to each other with an axial sliding ring (13) arranged therebetween which bears against mutually facing end faces of said flanges (11,12) and, together with these flanges (11,12) and a peripheral surface of one of the bearing rings (6), defines a pressure chamber (15), pressure oil from the interior of the bearing penetrating into this pressure chamber (15) and flowing from there with a clear loss of pressure out of the needle roller bearing (1) by passing between at least one of said end faces of the flanges (11,12) and the axial sliding ring (13).

2. A needle roller bearing of claim 1 wherein a piston ring (14) interrupted by a slit bears against a peripheral surface of one of the bearing rings (6) and against an inner end face of the axially inner flange of the other bearing ring (8) facing the needle rollers (9).

3. A needle roller bearing of claim 1 wherein the axial sliding ring (13) arranged between parallel-faced flanges (11,12) has a substantially L-shaped longitudinal cross-section and an axially oriented arm (16) of the axial sliding ring (13) bears against the end face of one of the flanges (12) so that a recess (17) opening towards the pressure chamber (15) is formed between this end face and the axial sliding ring (13).

4. A needle roller bearing of claim 1 wherein an end face of one of the flanges (12) facing the axial sliding ring (13) comprises a step (18) whereby a recess (19) opening towards the pressure chamber (15) is formed.

5. A needle roller bearing of claim 1 wherein the shaft (3) serves as a pump shaft of an automatic transmission which is connected at one end to a primary part (3a) of a hydrodynamic torque converter and, at a second end, to an impeller of a primary pump, the outer bearing ring (6) being deposed in a pump casing (2) and a radial sealing ring (5) being arranged downstream of the axially outer flange (11).

* * * * *